United States Patent [19]
Brown et al.

[11] Patent Number: 5,351,093
[45] Date of Patent: Sep. 27, 1994

[54] PHASE ALTERNATING LINE VIDEO SIGNAL PROCESSING APPARATUS

[75] Inventors: David J. Brown, Ringwood; David C. Conway-Jones, Winchester; Jong-Han Kim, Morden; Peter M. Smith, Winchester, all of England

[73] Assignee: International Business Machines Corporation, Armonk, N.Y.

[21] Appl. No.: 60,084

[22] Filed: May 10, 1993

[30] Foreign Application Priority Data

May 8, 1992 [EP] European Pat. Off. ........ 92304175.0

[51] Int. Cl.⁵ .................. H04N 9/465; H04N 11/16
[52] U.S. Cl. ................................. 348/530; 348/502; 348/524
[58] Field of Search .............. 358/17, 18, 16, 13, 358/15, 21 R, 24, 320, 319, 324; 348/502, 524, 530; H04N 9/465, 11/16

[56] References Cited

U.S. PATENT DOCUMENTS 4,178,607 12/1979 Mikado ..................... 358/17
4,308,550 12/1981 Melwisch et al. ........... 358/18
5,119,197 6/1992 Kuroda ...................... 358/13

FOREIGN PATENT DOCUMENTS 2101889 4/1990 Japan ................... H04N 11/16

*Primary Examiner*—Mark R. Powell
*Assistant Examiner*—Jeffrey S. Murrell
*Attorney, Agent, or Firm*—Martin J. McKinley

[57] ABSTRACT

Signal processing apparatus comprises a chrominance subsampler (10) for sampling the U and V components of a PAL video signal in response to an enable signal. A counter (30) responsive to the horizontal synchronization component of the PAL video signal generates the enable signal upon detection of a predetermined number of horizontal synchronization pulses. Logic (60,70,80) responsive to the vertical synchronization component of the PAL video signal resets and disables the counter (30) upon detection of a vertical synchronization pulse. Logic (50,60,70,80) restarts the counter (30) from a reset state upon detection of a predetermined polarity in the V component of the PAL video signal.

6 Claims, 4 Drawing Sheets

FIG. 5

PHASE ALTERNATING LINE VIDEO SIGNAL PROCESSING APPARATUS

CROSS-REFERENCES TO RELATED APPLICATIONS

Pursuant to 35 U.S.C. 119, Applicants claim the benefit of the filing date of European Application No. 92304175.0 filed May 8, 1992.

BACKGROUND OF THE INVENTION

This invention pertains to video signal processing apparatus and, more particularly, to a phase alternating line (PAL) video signal processing apparatus with improved chrominance subsampling consistency between frames in the absence of delay line averaging.

A video signal for broadcast television (TV) reception conventionally comprises luminance information Y and chrominance information having color difference components U and V (B-Y and R-Y respectively). U represents saturation and V represents hue. The video signal also comprises a reference or color burst to permit broadcast television receivers to decode the chrominance information. In broadcast TV receivers, a phase error can be introduced between the color burst and the chrominance information by, for example, variations in transistor input impedances. The phase error can, if uncorrected, degrade picture quality at the receiver.

In PAL TV systems, the effect of the phase error on the decoded chrominance information is reduced by inverting the V component on alternate field lines. Thus, the phase error, if constant over two successive field lines, deflects the hue of one line in one direction and the hue of the other line in the opposite direction by a corresponding amount.

A typical PAL TV receiver comprises a PAL color decoder having a delay line of one line period so that the chrominance element transmitted during field line n can be retained and averaged with that on field line $n+1$. This cancels the effect of the phase error in the received video signal. Each frame displayed on a TV monitor comprises two interlaced fields of lines. The delay line averaging circuitry effectively smears color in each frame spatially over groups of four lines. Therefore, the delay line reduces the vertical chrominance bandwidth of the receiver.

PAL video capture adapters for computer systems and the like usually comprise a chrominance subsampler for subsampling the U and V components of a decoded PAL video signal to reduce memory requirements and processing time. In practice, a factor of 8:1 reduction in chrominance information will still produce acceptable picture quality. The chrominance subsampler usually extracts chrominance information from every $n^{th}$ pixel of every $m^{th}$ line of a frame where n and m are integers greater than 1 and usually less than 10. However, because TV picture frames conventionally contain an odd number of lines (625 for example), the V component corresponding to a line in one frame has a different polarity to the V component corresponding to the same line in the next frame. Therefore, without the aforementioned delay line averaging, the chrominance subsampler samples V components of different polarities from one frame to the next. The phase error produces undesirable color flashing between successive frames, particularly in highly saturated reds. The color flashing is produced by beating between the subsampling frequency and the four field phase alternation pattern of the PAL video signal.

SUMMARY OF THE INVENTION

Briefly, the invention is a signal processing apparatus comprising: a chrominance subsampler for sampling the U and V components of a PAL video signal in response to an enable signal; a counter responsive to the horizontal synchronization (sync) component of the PAL video signal for generating the enable signal upon detection of a predetermined number of horizontal sync pulses of the PAL video signal; logic responsive to the vertical sync component of the PAL video signal for disabling the counter upon each detection of a vertical sync pulse of the PAL video signal; and logic for restarting the counter from a reset state upon detection of a predetermined polarity in the V component of the PAL video signal.

The signal processing apparatus of the present invention advantageously permits chrominance information in a PAL video signal to be subsampled without delay line averaging and without incurring undesirable color changes between successive frames. In this invention, undesirable color changes are avoided by maintaining chrominance subsampling consistency between one frame and the next. Because this invention achieves acceptable picture quality without delay line averaging, an image capture adaptor for a computer or the like can have wider vertical chrominance bandwidth.

The predetermined number may be even or odd and, equally, the predetermined polarity may be positive or negative. However, in a preferred embodiment of the present invention, the predetermined number is a multiple of two and the predetermined polarity is positive.

This advantageously permits acceptable pictures to be generated based on chrominance information subsampled from NTSC format media without conventional delay line averaging.

The counter may be responsive to only horizontal sync pulses corresponding to one field of each frame of the video signal. Alternatively, the counter may be responsive to horizontal sync pulses corresponding to both fields of each frame of the video signal.

It will be appreciated that the present invention extends to an image capture adaptor for a computer system, comprising such signal processing apparatus.

According to another aspect of the present invention, there is provided a method of subsampling a PAL video signal, the method comprising: generating, from a counter, an enable signal upon detection of a predetermined number of horizontal sync pulses in the horizontal sync component of the PAL video signal; sampling the U and V components of the video signal in response to the enable signal; resetting and disabling the counter upon detection of a vertical sync pulse in the vertical sync component of the PAL video signal; and restarting the counter from a reset state upon detection of a predetermined polarity in the V component of the PAL video signal.

BRIEF DESCRIPTION OF THE DRAWING

FIG. 5 is a portion of a frame of pixels also processed in accordance with the present invention.

DESCRIPTION OF THE ILLUSTRATIVE EMBODIMENTS

Figure 1:
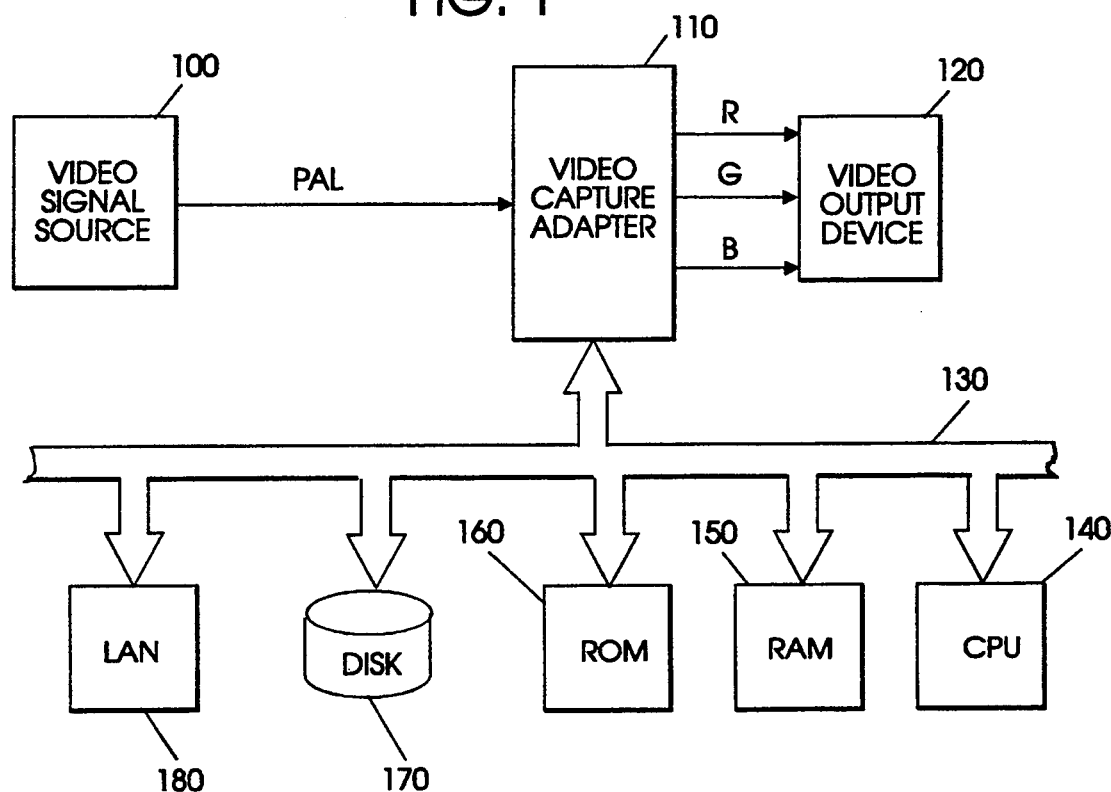
FIG. 1 is a block diagram of a computer system for processing a PAL video signal.

Referring first to FIG. 1, a computer system for processing a PAL video signal comprises a PAL video signal source 100, such as a PAL video camera, PAL video tape player or the like. The signal source 100 is connected to a video capture adaptor 110. The video capture adaptor 110 has red, green, and blue analog video outputs, R,G, and B, connected to a video output device 120, such as a video tape recorder, visual display unit or the like. The video capture adaptor 110 also has digital inputs and outputs connected to a bus architecture 130 of a host computer system such as a personal computer. The host computer system comprises a central processing unit 140, random access memory 150, read only memory 160, and large capacity storage 170, such as a hard disk drive, tape streamer or the like, all interconnected by the bus architecture 130. The bus architecture 130 may also be connected to other computer systems in a local area network 180. It will be appreciated that the video capture adaptor 110 may be in the form of a peripheral card adapted to be releasably connected to the bus architecture 130 of the host computer system.

In operation, the image capture adaptor 110 extracts the luminance information and the chrominance information from the PAL video signal. The luminance information is sampled and digitized by a luminance sampler of the capture adaptor 110 at a sampling clock frequency synchronized to the horizontal synchronization pulses of the PAL video signal. Typically, the video signal is sampled 1000 times per line. The chrominance information is subsampled and digitized by signal processing apparatus in the capture adaptor 110 at a fraction of the sampling clock frequency. The central processing unit 140, under the control of an application computer program, can treat the digitized luminance and chrominance information as data that can be stored as a data file in the random access memory 150 or the storage device 170; communicated to other computer systems on the local area network 180; or adapted in the capture adaptor 110 for output to the video output device 120.

Figure 2:
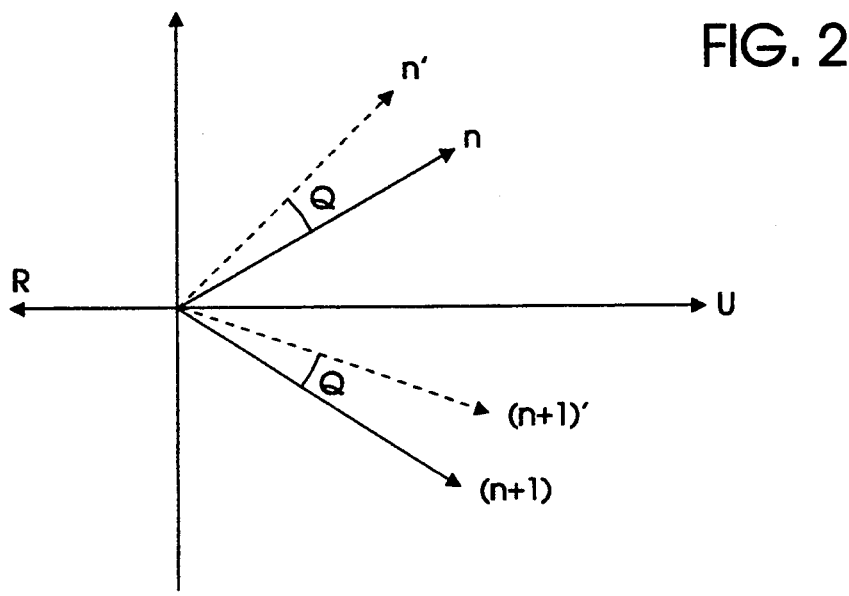
FIG. 2 is a phase diagram of the chrominance element of a PAL video signal.

Referring now to FIG. 2, the solid arrows are phasors representing the chrominance information in a PAL video signal corresponding to field lines n and n+1 with no phase error relative to the color burst R. As previously mentioned, in a PAL video signal, the chrominance information corresponding to field line n has a V component of the opposite polarity to the chrominance element corresponding to field line n+1. In practice, however, the phasors can be offset relative to the color burst R by a phase error of Q degrees, as indicated by the dashed arrows. Such a phase error makes the chrominance information corresponding to field line n too red and the chrominance element corresponding to field line n+1 too blue.

Figure 3:
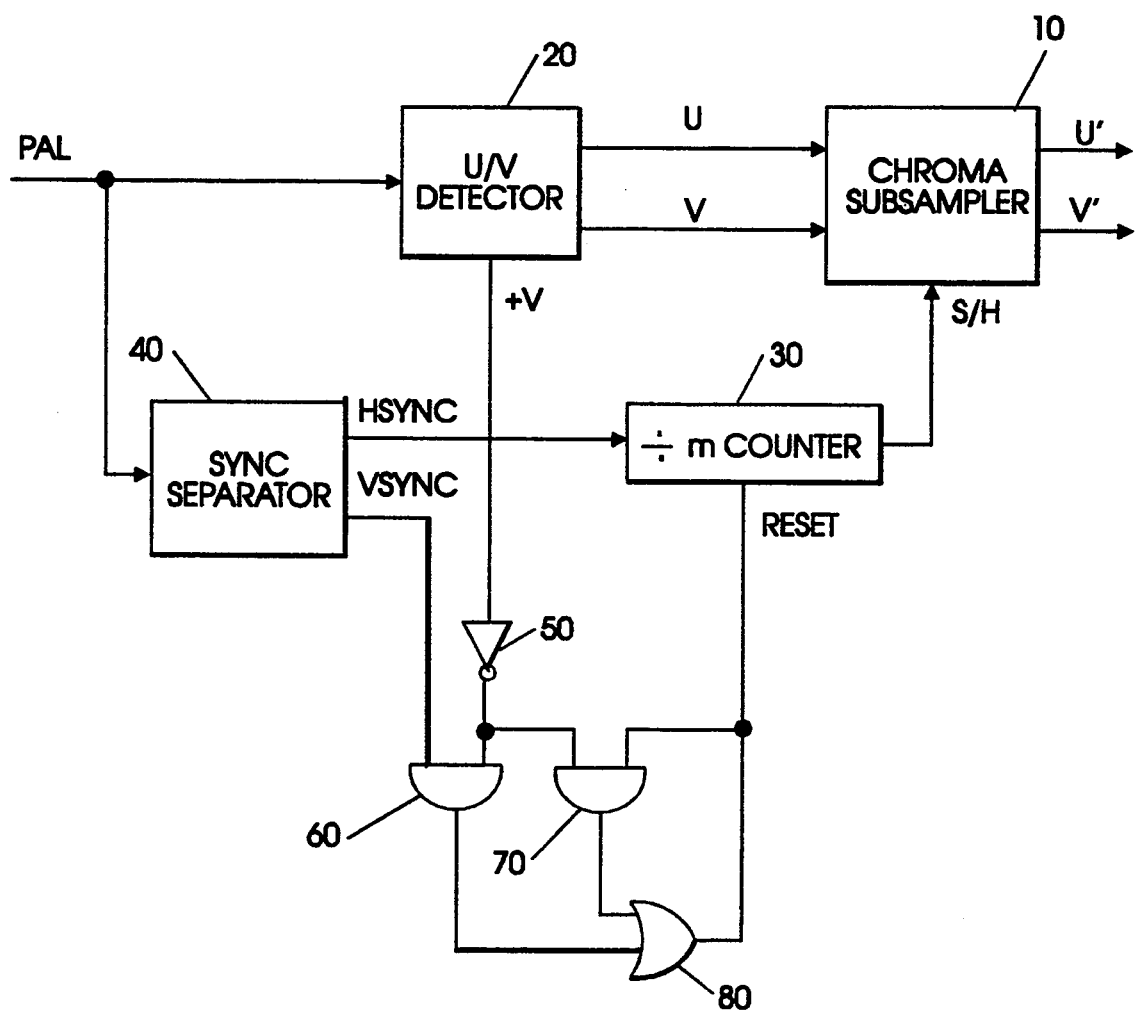
FIG. 3 is a block diagram of an example of signal processing apparatus of the present invention.

Referring to FIG. 3, an example of signal processing apparatus of the present invention comprises a chrominance subsampler 10 having inputs U and V connected to a chrominance detector 20. The chrominance subsampler 10 has a sample and hold input S/H connected to a divide by m counter 30 with an external reset. m determines the sampling interval of subsampler 10. A sync separator 40 has a horizontal sync output HSYNC connected to the clock input of counter 30 and a vertical sync output VSYNC connected to the reset input of the counter 30 via an AND gate 60 and an OR gate 80. AND gate 60 is enabled, via an inverter gate 50, by a +V output from chrominance detector 20. The +V output is the output from a conventional phase comparator (not shown) part of the chrominance detector. The reset input of the counter is latched by an AND gate 70 in combination with OR gate 80.

In operation, chrominance detector 20 extracts the U and V components from an interlaced PAL video signal. The +V output of chrominance detector 10 indicates the polarity of the V component. Sync separator 40 extracts, from the input video signal, the vertical sync component VSYNC and only the horizontal sync component HSYNC of fields containing even numbered frame lines. The fields containing even numbered and odd numbered frame lines will hereinafter be referred to as the even and odd fields respectively. The outputs of sync separator 40, the +V output of the chrominance detector, the reset input of counter 30, and the S/H input of chrominance subsampler 10 are active high.

Counter 30 is incremented by the even field horizontal sync signal HSYNC. Counter 30 generates an enable signal in the form of an output pulse on the S/H input of subsampler 10 when the count reaches m. Subsampler 10 stores the U and V components of every $n^{th}$ pixel along the current line in response to the enable signal from counter 30. Subsampler 10 therefore extracts one U component and one V component for every n×2m matrix of pixels of each frame of the video signal. The matrix is 2m lines wide because the video signal is interlaced.

At the end of each field of each frame of the video signal, counter 30 is reset by the vertical sync signal VSYNC, via AND gate 60 and OR gate 80, in preparation for the next field. In accordance with the present invention, AND gate 70, in combination with OR gate 80, holds the reset input of counter 30 active to disable counter 30 when VSYNC returns to an inactive state. The reset input of counter 30 is only returned to an inactive state when the +V output of chrominance detector 20 goes active and, therefore, disables AND gate 70. Thus, at the start of each field, counter 30 is only restarted from a reset state upon detection, by chrominance detector 20, of a positive polarity V component in the video signal.

Figure 4:
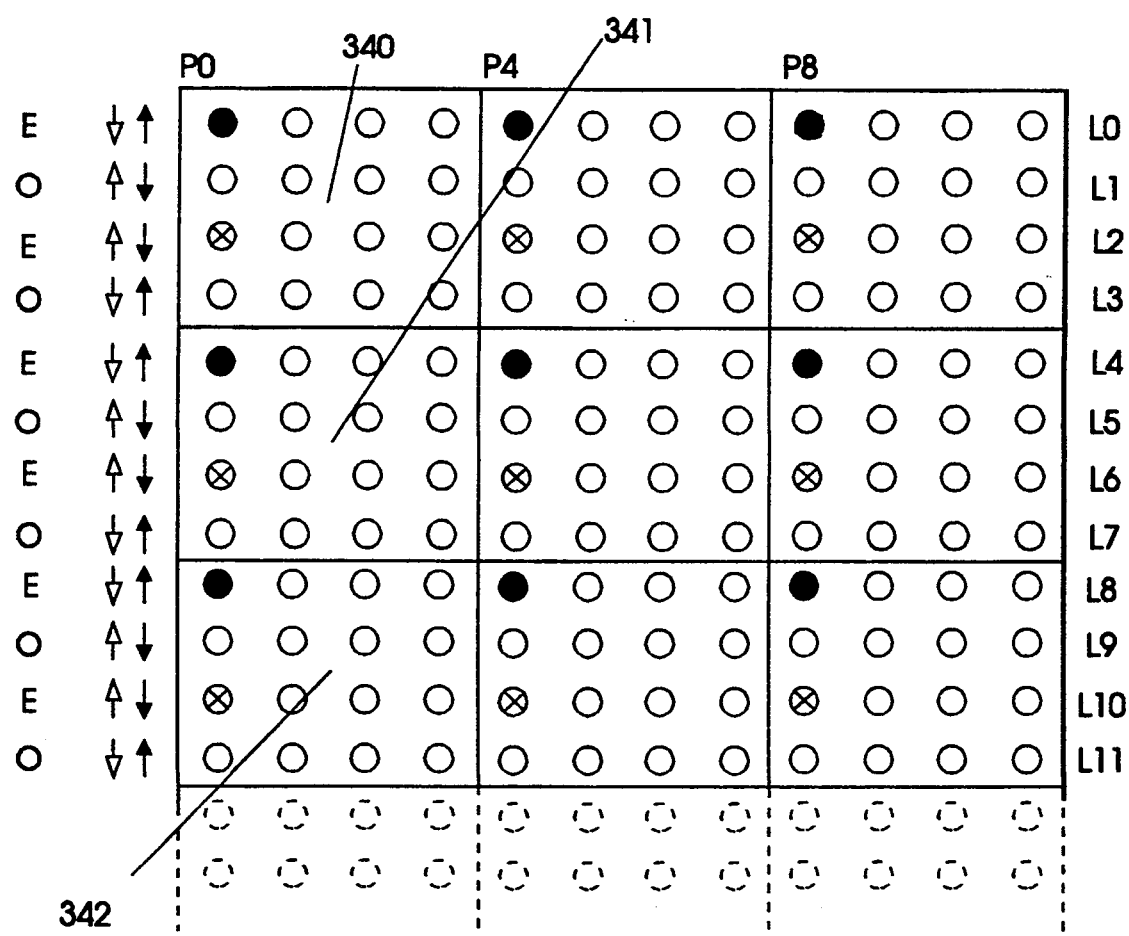
FIG. 4 is a portion of a frame of pixels processed in accordance with the present invention.

Referring now to FIG. 4, and assuming for the purposes of explanation only that n and m are set to 4 and 2 respectively, chrominance subsampler 10 extracts the U and V components corresponding to one pixel for each 4×4 matrix 340 of pixels of a frame. The shaded and unshaded arrows indicate the polarities of the V component of the chrominance information for each line in frames N and N+1 of the video signal, respectively. The first line of the even field of the illustrated portion of Frame N in which the V component of the chrominance information is positive is line L0. Counter 30 generates output pulses at L0, L4, L8 . . . . Therefore, chrominance subsampler 10 stores the U and V components corresponding to every fourth pixel P0, P4, P8 . . . from lines L0, L4, L8 . . . .

In frame N+1, the polarity of the V component of the chrominance information at lines L0, L4, L8 . . . has now switched because of the odd number of lines in the frame. AND gate 70 holds counter 30 in a reset state until the V component of the chrominance information is positive. The first line of the even field of the illustrated portion of frame N+1 in which the V component of the chrominance information is positive is now line L2 and not line L0. Counter 30 now generates an enable signal at lines L2, L6, L10 . . . . Therefore, chrominance subsampler 10 now stores the U and V components corresponding to every fourth pixel P0, P4, P8 . . . from lines L2, L6, L10 . . . . Chrominance sub sampler 10 thus stores the U and V components corresponding to one pixel of each of the same 4×4 matrices of pixels in both frames N and N+1. The only difference is that the pixels corresponding to the U and V components stored from Frame N are on different lines to the pixels corresponding to the U and V components stored from Frame N+1. In accordance with the present invention, the V components stored for pixel matrices 340, 341, and 342 of frame N therefore have the same polarities as the V components stored for pixel matrices 340, 341, and 342 of frame N+1.

Figure 5:
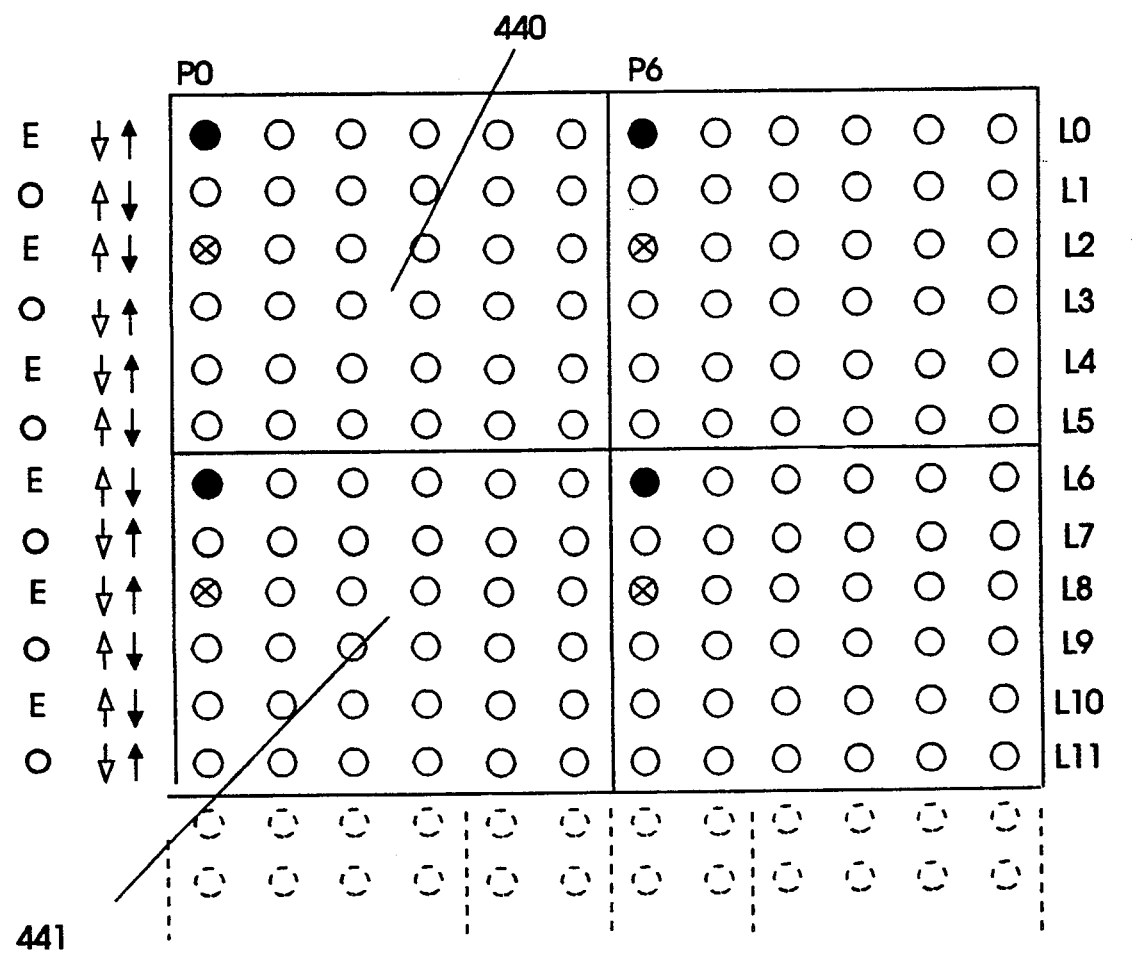

Referring to FIG. 5, and now assuming for the purposes of explanation only that n and m are set to 6 and 3 respectively, chrominance subsampler 10 extracts the U and V components corresponding to one pixel for each 6×6 matrix 440 of pixels of a frame. The first line of the even field of the illustrated portion of frame N in which the V component of the chrominance information is positive is line L0. Counter 30 generates output pulses at L0, L6 . . . . Therefore, chrominance subsampler 10 stores the U and V components corresponding to every fourth pixel P0, P6 . . . from lines L0, L6 . . . .

In frame N+1, the polarity of the V component of the chrominance information at lines L0, L6 . . . switched because of the odd number of lines in the frame. AND gate 70 holds counter 30 in a reset state until the V component of the chrominance information is positive. The first line of the even field of the illustrated portion of frame N+1 in which the V component of the chrominance information is positive is now line L2 and not line L0. Counter 30 now generates an enable signal at lines L2, L8 . . . . Therefore, chrominance subsampler 10 now stores the U and V components corresponding to every fourth pixel P0, P6 . . . from lines L2, L8 . . . . In accordance with the present invention, the V components stored for pixel matrices 440 and 441 of frame N therefore have the same polarities as the V components stored for pixel matrices 440 and 441 of frame N+1.

In the embodiments of the present invention described above, the outputs of sync separator 40, the +V output of the chrominance detector, the reset input of counter 30, and the S/H input of chrominance subsampler 10 are active high. However, it will be appreciated that, in other embodiments of the present invention, these inputs and outputs may be active low. Furthermore, in the embodiments of the present invention described above, the chrominance information is subsampled from even fields of the video signal exclusively. It will be appreciated, however, that in other embodiments of the present invention, the chrominance information may be subsampled from odd fields of the video signal exclusively, or from a combination of odd and even fields of the video signal, and in either case, without loss of subsampling consistency between frames.

In the embodiments of the present invention described above, chrominance subsampler 10 is controlled by hardwired logic circuits. It will be appreciated, however, that in other embodiments of the present invention, chrominance subsampler 10 may be controlled by a programmed processing unit such as a microprocessor or by a combination of a programmed processing unit and hardwired logic. Furthermore, in the embodiments of the present invention described above, the counter is restarted from a reset state only upon detection of a positive polarity in the V component of the chrominance information. In other embodiments of the present invention, however, the counter may be restarted from a reset state only upon detection of a negative polarity in the V component of the chrominance information.

What is claimed is:

1. Signal processing apparatus comprising:
    a chrominance subsampler for sampling the U and V components of a PAL video signal in response to an enable signal;
    a counter responsive to the horizontal synchronization pulses of the PAL video signal for generating the enable signal upon detection of a predetermined number of horizontal synchronization pulses of the PAL video signal;
    first logic circuitry responsive to the vertical synchronization pulses of the PAL video signal for disabling the counter upon each detection of a vertical synchronization pulse of the PAL video signal; and
    second logic circuitry for restarting the counter from a reset state upon detection of a predetermined polarity in the V component of the PAL video signal.

2. Apparatus as claimed in claim 1 wherein said predetermined number is a multiple of two.

3. Apparatus as claimed in claim 2 wherein said predetermined number is two.

4. Apparatus as claimed in claim 1 wherein said counter is responsive to horizontal synchronization pulses corresponding to one field of each frame of the video signal.

5. Apparatus as claimed in claim 1 wherein said predetermined polarity is positive.

6. A method of subsampling a PAL video signal, the method comprising:
    generating, via a counter, an enable signal upon detection of a predetermined number of horizontal synchronization pulses in the horizontal synchronization component of the PAL video signal;
    sampling the U and V components of the video signal in response to the enable signal;
    resetting and disabling the counter upon detection of a vertical synchronization pulse in the vertical synchronization component of the PAL video signal; and
    restarting the counter from a reset state upon detection of a predetermined polarity in the V component of the PAL video signal.

* * * * *